C. L. FLEISCHMANN.
Plow.
No. 62,325. Patented Feb. 26, 1867.
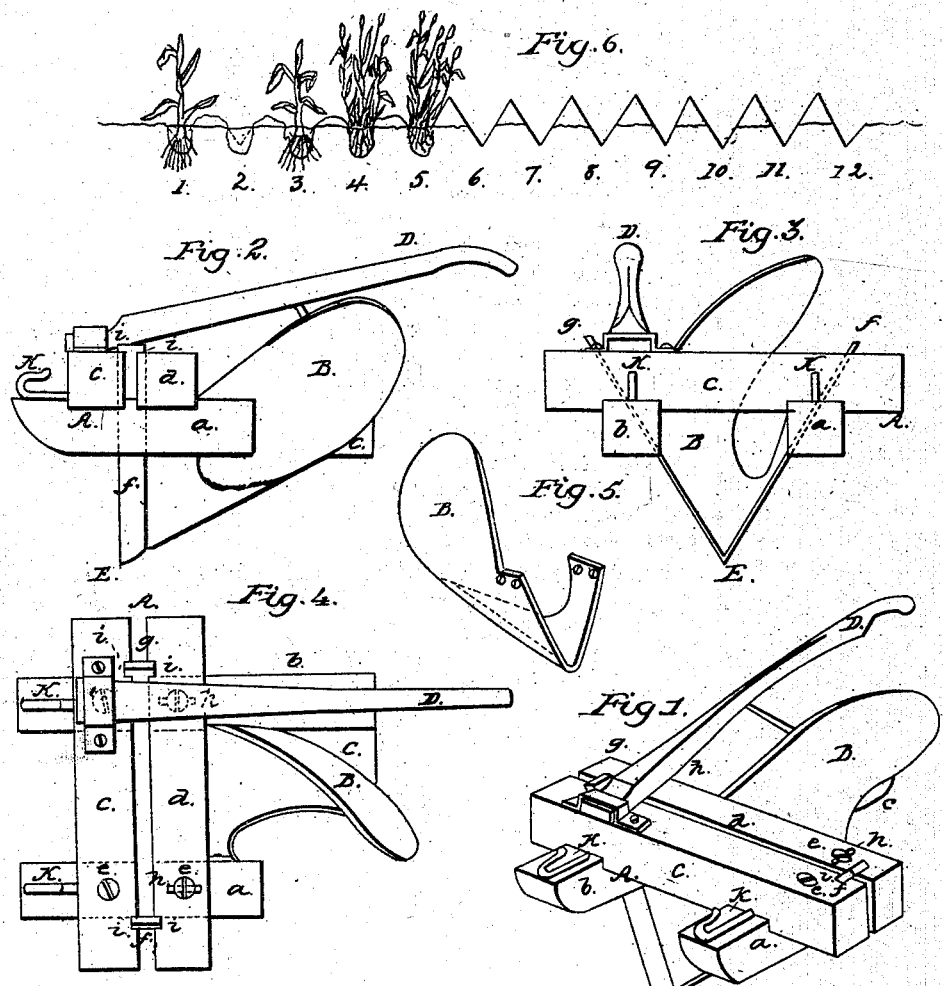

United States Patent Office.

CHARLES LOUIS FLEISCHMANN, OF NEW YORK, N. Y.

Letters Patent No. 62,325, dated February 26, 1867; antedated February 14, 1867.

---

IMPROVEMENT IN PLOUGHS.

---

The Schedule referred to in these Letters Patent and making part of the same.

---

TO ALL WHOM IT MAY CONCERN:

Be it known that I, CHARLES LOUIS FLEISCHMANN, of the city of New York, in the county of New York, State of New York, have invented new and useful improvements in Ploughs; and I do hereby declare that the following is a full, clear, and exact description of the construction and operation of the same, reference being had to the annexed drawings, making a part of this specification, in which—

Figure 1 is a perspective view.

Figure 2, a side view.

Figure 3, a front view.

Figure 4, a top view.

Figure 5, a perspective of the mould-board.

Figure 6, a sectional view of the mode of ploughing with the new plough, showing the furrows and ridges and the method of planting.

The nature of my invention consists in attaching to a frame, resting upon runners, an angular cutting apparatus, and a mould-board which lifts and turns the furrow slice over on the unploughed part of the land, ploughing it in open furrows and ridges, as shown in fig. 6, (6, 7, 8, 9, 10, 11, 12.)

To enable others skilled in the art to make and use my invention, I will proceed to describe its construction and operation.

The frame A, (see figs. 1, 2, 3, and 4,) in which the cutters and mould-board are secured, consists of two runners, $a$ and $b$, which are held to their places by means of two cross-ties, $c$ and $d$, and firmly fastened to it by screws or bolts $e$ $e$ $e$ $e$. The distance at which the runners are placed from each other depends on the width of the furrow intended to be cut; for one-horse ploughs they may be from five to six inches apart. The runners are rounded up in front, in order that they may slide easily over the ground. The runner $b$ (see fig. 4) is longer than the opposite one, $a$, in order to make the plough more steady and to support the ear of the mould-board. The cutting apparatus E consists of two straight or curved cutters, $f$ and $g$, which are placed in such a manner as to form an acute angle, to cut a furrow which is wide on the top and pointed or rounded up at the bottom. The cutters are kept in their proper position by the cross-ties $c$ and $d$, and are provided for that purpose with notches, $i$ $i$ $i$ $i$, cut near their extremities in such a manner as to follow the inclination of the cutters and to embrace them. The cross-tie $d$ is made adjustable, by means of the slots $h$ $h$, through which the screws or bolts pass for fastening the cross-tie. The mould-board B is made of metal; in front it has the shape of the letter V, corresponding with the angle of the cutters. (See figs. 1, 3, and 5.) To keep the mould-board in its proper position, and to give the plough greater solidity, both wings of the V-shaped front part are fastened to the sides of runners $a$ and $b$. The lower part of the mould-board B rises gradually from the points of the cutters, whereby the furrow slice is forced to rise towards the top of the land, when it is turned over by the hind part of the mould-board. The hind part or ear of the mould-board is supported by the wedge C, which is introduced between the runner $b$ and mould-board B. The handle D serves for guiding the plough. The hooks $k$ $k$ serve for hitching the working cattle to the plough.

Operation.

When the plough is drawn forward, the cutting apparatus, being angular, enters easily into the land, and cuts a furrow corresponding to the shape of the cutters; the furrow slice is gradually lifted by the mould-board to the top of the unploughed land, and there turned over in such a manner that the sod or top part is turned face down upon the land close to the furrow, thus ploughing the land alternately in ridges and furrows, as is illustrated in fig. 6. This plough, after being once started, requires no further attention, on account of having two runners and a cutting apparatus close to the land.

Advantages.

The advantages derived from the work of this improved plough are numerous and of great importance.

1. It is exceedingly simple in its construction, strong and durable, and easily kept in repairs. It is a cheap prairie plough, and the very implement for poor settlers on prairies, who have not the means to purchase or hire heavy, costly prairie ploughs and the necessary teams to work them.

2. It saves one-half of the labor and time in breaking up wild prairies, as only one-half of the land is actually ploughed, the other half is covered with the furrow slices forming the ridges. (See fig. 6.)

3. One horse is sufficient to work it. It may be worked single or in gangs. For instance, four such ploughs, drawn by four horses, would plough four furrows, each of five inches=twenty inches; the four furrow slices cover twenty inches more, making, together, forty inches in one passage of the plough—an amount of work which no prairie plough in existence, with the strongest team imaginable, could accomplish, besides the new plough requiring only one man to drive the four horses.

4. This plough works the land in such a manner that any kind of crop can be raised at once. The soil in the open furrows can be immediately stirred up and prepared for planting. Now the farmer has to wait months before the sod is decomposed and the land in a proper state to be worked.

5. Besides the above-named advantages, it fulfills all the conditions of rational agriculture. It admits at once the atmospheric air into the subsoil, the ridges afford protection against winds, and partly against the hot rays of the sun to the young, delicate plants; which is one of the most indispensable conditions in the culture of forest trees from seeds. The young plant is gradually supplied with loose soil to cover its delicate roots and retain moisture; this loose soil is derived from the ridges, which, in the process of decomposition, detach the finer particles, which fall down on the furrow below or are washed down by the rain.

*Claim.*

What I claim as my invention, and desire to secure by Letters Patent, is—

The use of runners herein described, in combination with angular or curved cutters, and a mould-board, substantially as above described.

CH. L. FLEISCHMANN.

Witnesses:
    ALBERT WILLMANN,
    R. H. HERTZOG.